INVENTORS
CONSTANTINE PEZARIS
THEOPHANES PANTAZELOS
BY ROSEN & STEINHILPER
ATTORNEYS

United States Patent Office 3,677,831
Patented July 18, 1972

3,677,831
STRESS RELIEF IN SOLID MATERIALS
Constantine Demetrius Pezaris, Nahant, and Theophanes G. Pantazelos, Somerville, Mass., assignors to Lodding Engineering Corporation, Auburn, Mass.
Filed May 14, 1970, Ser. No. 37,127
Int. Cl. C21d 1/04
U.S. Cl. 148—12.9
6 Claims

ABSTRACT OF THE DISCLOSURE

A method and apparatus are disclosed for relieving stress in solid materials. Vibrations are applied to a workpiece, which are varied through a given frequency range in a specific time interval according to a reproducible pattern, and signals which sample a reaction of the workpiece to the vibrations are recorded along the path or paths of a point or points being displaced with respect to time in synchronism with the reproducible pattern.

BACKGROUND OF THE INVENTION

This invention relates to the vibration of solid materials, such as metals, to produce relief of internal stresses. The general process is well known; a description of it may be found in an article entitled "Tried Vibratory Stress Relief?" by Stanley R. Rich, published in American Machinist, Apr. 8, 1968, pp. 110–111. It involves the production—by vibration—of microscopic slip along intercrystalline surfaces (slip planes) in those directions which reduce the pressures or tensions among the crystals of the material that are due to residual stress. The induced vibration sets up alternating stresses at the frequency of vibration. A program of cyclical stressing of a workpiece can act to reduce, and for practical purposes, essentially to eliminate, internal stresses that are present in it before the vibration is employed.

Apparatus to practice the process comprises bascially a vibrator which can be attached to the workpiece to induce vibration in the workpiece, and an electromechanical transducer (accelerometer) attached to the same workpiece to monitor the induced vibration. The vibrators currently in use employ variable speed electric motors, and the power supplies furnish variable power to the armature to control the motor speed. Thus, by turning a knob on the control panel of the power supply, one can adjust the frequency of the vibrator. Typical apparatus is illustrated in the above referenced article of Rich. The measure of power supplied to the vibrator is indicated in terms of armature current to a direct current electric motor by a meter on the control panel, and the amplified output from the accelerometer is indicated by another meter. As the frequency control knob is turned, one can observe both meters to find when a frequency of resonance for the workpiece is reached. The frequency control (speed control) knob is varied by the operator until he finds that the workpiece is vibrating to the greatest degree possible. This has been considered important because it is believed in practice that the best and simplest method of putting a workpiece through a series of alternating stress cycles is by exciting the workpiece into mechanical resonance with an external vibrator. In practice, several resonance frequencies may be observed in this manner, and in some materials it may be considered desirable for effective stress relief to excite the workpiece for a period of time at each of a number of frequencies of mechanical resonance.

It is characteristic of many metals, such as steel and stainless steel, that mechanical resonances build up in them slowly. Thus, it may take several seconds, up to ten or more, for the amplitude of vibration at a frequency of mechanical resonance to reach a significant portion of the ultimate amplitude of vibration. In consequence, it has been deemed important that the vibrator frequency be varied very slowly to avoid passing over a frequency of resonance without noticing it. In practice, it has been found that steel and stainless steel objects often take as long as 20 to 30 seconds before final amplitude of resonance is established. Thus an attempt to examine a workpiece thoroughly over a range of several hundred cycles could take several hours time.

By plotting armature current vs. frequency on a chart, one can make a record of resonance frequencies, and compare records before and after treatment. This is a slow and tedious hand process, and does not assure that frequencies of mechanical resonance will not be passed over. Permanent records on chart paper have been made of armature current and accelerometer outputs corresponding to particular settings of the frequency control knob, to achieve the same results.

DESCRIPTION OF THE INVENTION

In the present invention an entirely new and unexpected result is achieved. Methods and means are provided to find one or more frequencies at which a workpiece should be vibrated to relieve stresses in it, automatically, quickly and with reliability. Frequencies found are not necessarily the same as, or harmonically related to, so-called "resonance" frequencies or harmonics of them which are found and used according to the prior art. That is, the frequencies found by the method of the present invention are not necessarily related to mechanical resonance frequencies of the workpiece; they may signify the presence of stresses not heretofore detected.

Generally, according to the method of the invention, the frequency of energy applied to the vibrator is varied in a time interval, which is typically about five minutes, through a given range of frequencies with respect to time according to a reproducible pattern, and signals, such as armature current and accelerometer output, which sample a reaction of the treated body to the vibratory energy, are recorded along the path or paths of a point or points being displaced with respect to time in synchronism with said reproducible pattern. The signals as so recorded are found to indicate one or more abrupt changes in character with respect to frequency. The abrupt nature of this change is an order of magnitude sharper than a resonance-frequency manifestation in the prior art. Thus, in a prior art example, where the frequency of vibration ranged between zero and 150 cycles per second, a change manifesting a resonance frequency consisted of an increased rate of increase in armature current with respect to frequency, the increased rate extending over a span of ten cycles per second—from 120 to 130 c.p.s. in the present invention abrupt changes are found to occur in a frequency span of a fraction of a cycle to one or two cycles, and they make sharp discontinuities with respect to frequency in the recording trace or traces. These abrupt changes are believed to signify the presence of stresses not heretofore detected. Stress relief is achieved by applying vibratory energy to the workpiece long enough to reduce these discontinuities to insignificance. The applied frequency need not be the same as the frequency at which the discontinuity occurs. The important fact is that after treatment, absence of the discontinuity signifies relief of the stress that caused it. The present invention thus provides a new, faster and better method of detecting stresses, and for advising of the fact of their relief.

Apparatus for practicing the invention may include a recorder with a constant chart speed, to record both armature current and accelerometer output, and a constant speed motor for varying the vibrator frequency through a given range of frequencies in the allotted time interval. For example, a system according to the invention uses a recorder with a chart speed of 50 mm./min., recording on one trace armature current (0–5 amps DC) and on another trace the level of the amplified output from the accelerometer (0–1 milliampere). The vibration frequency is varied by means of (e.g.) a 10-turn digital dial (coupled to the armature-current potentiometer), and the dial is turned through its range by a constant speed motor (2 r.p.m.) in five minutes (10 turns÷2 r.p.m.=5 min.). In this way, the vibrator motor speed is changed from zero to full speed uniformly such that the full frequency range of the vibrator is scanned at a constant rate in five minutes. The recorder and frequency changer both operate at constant speed (i.e.: a reproducible prescribed pattern), such that the recordings automatically display information as a function of frequency. When this is done, the recordings exhibit the above-referenced sharp discontinuities not heretofore observed. In fact, recordings made with the present invention might be deemed too fast for build-up of the mechanical resonances sought by the prior art.

The invention will be better understood from the following more detailed description of an embodiment. This description refers to the accompanying drawings, in which.

Figure 1:
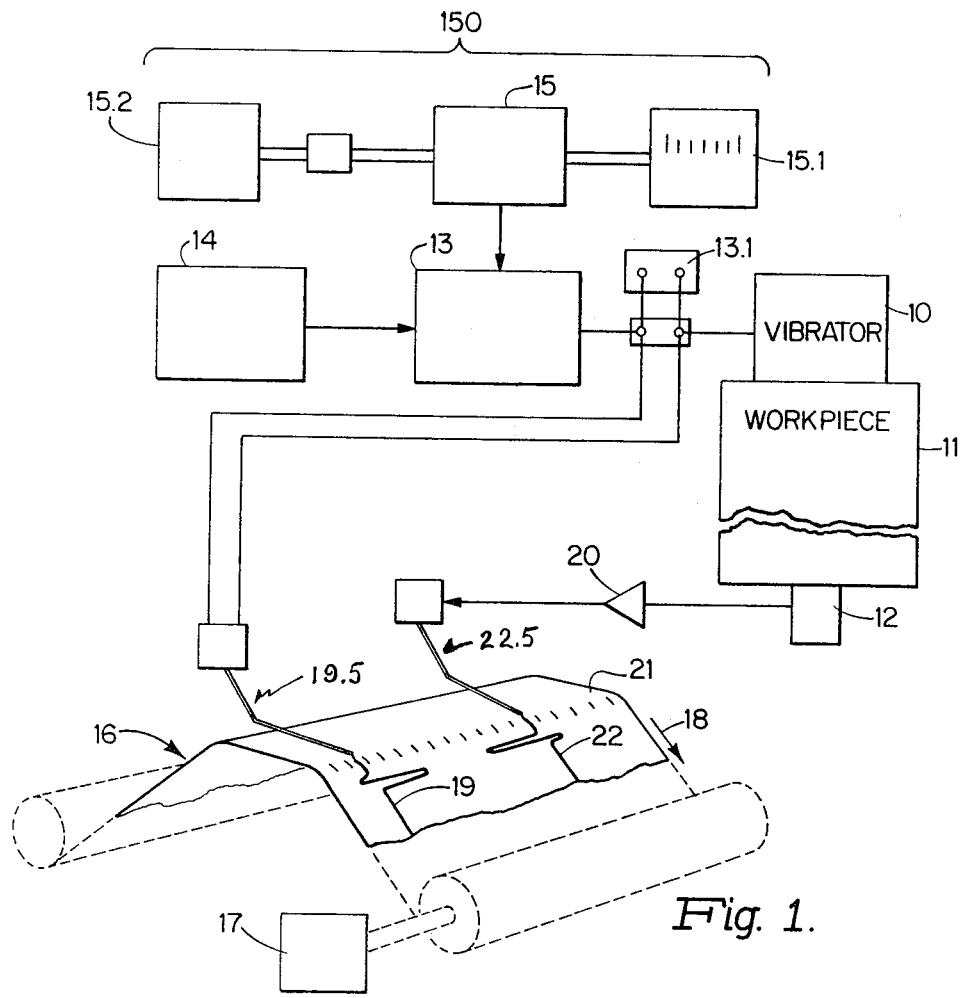
FIG. 1 is a block diagram of a system according to the invention.

In FIG. 1, a vibrator 10 is attached to a workpiece 11 at a first location, and an acceleration transducer 12 is attached to the workpiece at another location. A frequency control 13 between the power supply 14 and the vibrator 10 serves to control the frequency of vibration of the vibrator. Typically, the power supply furnishes direct current to the armature of a DC motor in the vibrator assembly, and the frequency control is a potentiometer 15 controlling the armature current via the frequency control 13. Typically, the frequency control 13 may be a motor speed control system with provision for a remote potentiometer as the speed-setting component. An auto-scan system 150 which includes the potentiometer 15 causes the frequency control 13 to vary the armature current from a low value (e.g.: zero ampere) to a higher value (e.g.: five amperes) in a given time interval (e.g.: five minutes), according to a prescribed pattern (e.g.: linearly) which is reproducible. The auto-scan system includes, typically, a potentiometer 15 of the multi-turn variety (e.g.: ten turn) coupled to a digital counting dial 15.1, which is turned by a constant speed motor 15.2 running at two revolutions per minute; for example, a synchronous motor running off 60 Hz. alternating current lines. The recorder 16 is driven in synchronism with the auto-scan system, for example, by a second synchronous motor 17. Recorder chart paper 21 moves in the direction of arrow 18. A signal representing armature current is taken from the shunt of the ammeter 13.1 in the frequency control 13 and recorder via pen assembly 19.5 on a first trace 19. The output of the acceleration transducer 12 is amplified in an amplifier 20 and the amplified signal from the transducer is recorded via a second pen assembly 22.5 on a second trace 22 in the recorder.

Figure 2:
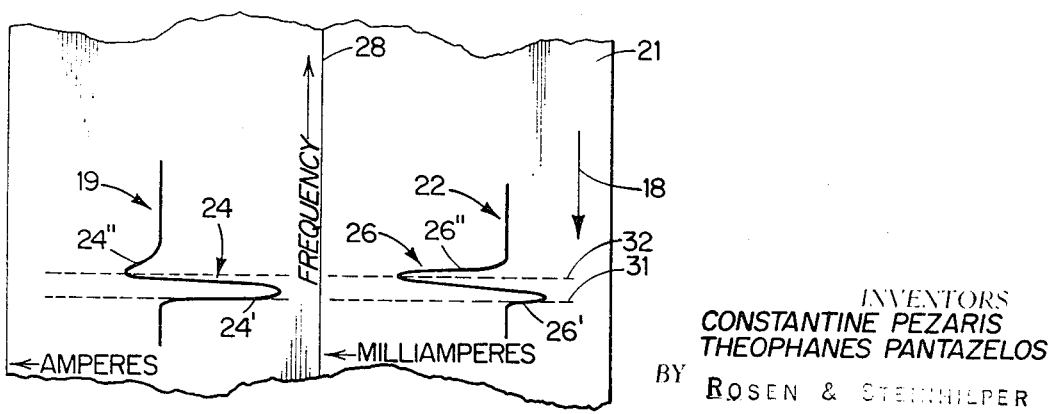
FIG. 2 illustrates a recording made according to the invention.

FIG. 2 is a plan-view segment of the recorder chart paper 21. Small portions of traces 19 and 22 are shown for the same time interval, in which sharp discontinuities 24 and 26 respectively occur simultaneously in the armature current trace 19 and the accelerator transducer trace 22, respectively. The armature current undergoes an abrupt relatively large swing 24' toward smaller current followed by an almost immediate reversal 24" and an overswing smaller in magnitude, toward increased current; the overswing vanishes almost as abruptly as the initial larger swing. In an actual example taken from a practical use of the apparatus, the magnitude of the larger swing 24' was a dip of about one-quarter ampere in a one-ampere armature current, which is about 25% of the motor current. This is a considerable change which the prior art had not known to exist. The entire discontinuity lasts for a time interval equivalent on the frequency scale 28, to almost one cycle, or at the most, two cycles. The dashed lines 31 and 32 represent the interval between frequencies that are one cycle apart. In some cases the initial pulse 24' swings out and back so rapidly that the recorder pen substantially retraces its own track on a scale such that it is over in less than the time interval of one cycle. The simultaneous discontinuity 26 in the transducer trace 22 begins with a relatively small excursion 26' toward lower current followed by a fast reversal into a larger excursion 26" toward higher transducer current, then by a rapid return to the baseline. The time interval that it lasts is about the same as the armature current discontinuity.

The traces shown in FIG. 2 were taken from a chart made in actual use of the invention, in which the normalized frequency of vibration ranged from 155 units to 650 units, a span of nearly 500 units, in a time interval of five minutes. There was thus a change in normalized frequency of 100 units in one minute or about 1.7 units per second. The time interval between the dashed lines 31 and 32 is, therefore, about one second, an interval which is at least an order of magnitude less than the time that would be required to establish a mechanical resonance in the workpiece.

The phenomenon that is detected by the present invention occurs abruptly and can be detected substantially instantaneously, and it may be found at several frequencies in the scanned frequency range. In the example under discussion, such discontinuities were found at about 208–9 units, 283 units, and 465 units. Following vibration for 10 minutes at 265 units, and 3 minutes at 465 units, the workpiece was again frequency scanned by the method of this invention and these discontinuities were found to be substantially absent.

What is claimed is:

1. The method of relieving stress in a body of metal by the application of vibratory energy to such material, comprising the steps of applying vibratory energy to said body, varying the frequency of such energy through a given range of frequencies with respect to time according to a reproducible prescribed pattern, as said frequency is varied deriving a succession of signals sampling a reaction of said body to said vibratory energy, recording said signals along the path of a point being displaced with respect to time in synchronism with said pattern so as to display said signals as a function of frequency of said vibratory energy, examining said signals as recorded for an abrupt change in character with respect to frequency, and continuing to apply said energy until the magnitude of said change is substantially reduced.

2. The method according to claim 1 comprising continuing to apply said energy in a band of frequencies narrower than said range and centered substantially on the frequency at which said change occurs.

3. The method of claim 1, comprising the further steps of detecting vibratory energy in said body, and as said frequency is varied, deriving from the detected energy a second succession of signals sampling another reaction of said body to said vibratory energy, recording said second succession of signals along the path of a second point being displaced with respect to time in synchronism with said pattern so as to display said second succession of signals as a function of frequency of said vibratory energy, examining each of said successions of signals as recorded for an abrupt change in character with respect to frequency occurring at substantially the same frequency for both successions of signals, and continuing to apply said energy until the magnitudes of said changes are substantially reduced.

4. The method according to claim 3 comprising continuing to apply said energy in a band of frequencies narrower than said range and centered substantially at said same frequency.

5. The method of relieving stress in a body of metal by the application of vibratory energy to such material, comprising the steps of coupling to the body a vibrator of which the frequency can be varied through a given range of frequencies by control of an external parameter, varying said parameter with respect to time according to a reproducible prescribed pattern, coupling to said body a transducer for detecting vibration in said body and converting energy of such vibration to corresponding signals, and recording said signals along the path of a point moving in synchronism with said pattern so as to display said signals as a function of frequency of said vibratory energy.

6. The method of relieving stress in a body of metal by the application of vibratory energy to such material, comprising the steps of coupling to the body a vibrator of which the frequency can be varied through a given range of frequencies by control of an external parameter, varying said parameter with respect to time according to a reproducible prescribed pattern, deriving from said vibrator signals which are momentarily representative of the load of said body on said vibrator, and recording said signals along the path of a point being displaced with respect to time in synchronism with said pattern so as to display said signals as a function of frequency of said vibrator.

References Cited

UNITED STATES PATENTS

| | | | |
|---|---|---|---|
| 1,939,712 | 12/1933 | Mahoux | 148—4 X |
| 2,848,775 | 8/1958 | Ettenrich | 148—4 X |
| 3,323,340 | 6/1967 | Bitzer | 148—12.9 X |

OTHER REFERENCES

Rich, S. R.: "American Machinist," Apr. 8, 1968, pp. 110–11.

OSCAR R. VERTIZ, Primary Examiner

G. O. PETERS, Assistant Examiner

U.S. Cl. X.R.

73—67.2